United States Patent
Deets et al.

(10) Patent No.: US 9,631,090 B2
(45) Date of Patent: Apr. 25, 2017

(54) TWO-STAGE CURE POLYIMIDE OLIGOMERS

(75) Inventors: Gary L. Deets, Coventry, CT (US); Jianming Xiong, North Brunswick, NJ (US)

(73) Assignee: I.S.T. (MA) Corporation, Indian Orchard, MA (US)

( * ) Notice: Subject to any disclaimer, the term of this patent is extended or adjusted under 35 U.S.C. 154(b) by 460 days.

(21) Appl. No.: 13/164,240

(22) Filed: Jun. 20, 2011

(65) Prior Publication Data

US 2011/0301285 A1 Dec. 8, 2011

Related U.S. Application Data

(60) Division of application No. 11/318,138, filed on Dec. 23, 2005, now Pat. No. 7,994,274, which is a continuation-in-part of application No. 10/931,070, filed on Aug. 30, 2004, now Pat. No. 7,129,318.

(60) Provisional application No. 60/499,849, filed on Sep. 2, 2003.

(51) Int. Cl.
 C08G 69/26 (2006.01)
 C08L 79/08 (2006.01)
 C08G 73/10 (2006.01)
 C09J 179/08 (2006.01)

(52) U.S. Cl.
 CPC ............. *C08L 79/08* (2013.01); *C08G 73/10* (2013.01); *C08G 73/101* (2013.01); *C08G 73/105* (2013.01); *C08G 73/1014* (2013.01); *C08G 73/1042* (2013.01); *C08G 73/1064* (2013.01); *C08G 73/1067* (2013.01); *C08G 73/1071* (2013.01); *C08G 73/1082* (2013.01); *C09J 179/08* (2013.01)

(58) Field of Classification Search
 CPC ...... C08G 73/10; C08G 73/1071; C08L 79/08
 See application file for complete search history.

(56) References Cited

U.S. PATENT DOCUMENTS

| | | | |
|---|---|---|---|
| 4,302,575 A | 11/1981 | Takekoshi | |
| 4,543,295 A | 9/1985 | St. Clair et al. | |
| 4,861,882 A | 8/1989 | Hergenrother et al. | |
| 4,944,824 A | 7/1990 | Gupta | |
| 4,954,195 A | 9/1990 | Turpin | |
| 5,091,505 A | 2/1992 | Serafini et al. | |
| 5,128,444 A * | 7/1992 | Inoue et al. | 528/353 |
| 5,132,395 A | 7/1992 | Serafini et al. | |
| 5,149,760 A | 9/1992 | Serafini et al. | |
| 5,149,772 A | 9/1992 | Serafini et al. | |
| 5,252,168 A | 10/1993 | Johnston et al. | |
| 5,268,223 A | 12/1993 | Qureshi et al. | |
| 5,272,245 A * | 12/1993 | Manos | 528/353 |
| 5,338,827 A | 8/1994 | Serafini et al. | |
| 5,344,982 A | 9/1994 | Hergenrother et al. | |
| 5,412,066 A | 5/1995 | Hergenrother et al. | |
| 5,432,001 A | 7/1995 | Serafini et al. | |
| 5,461,137 A | 10/1995 | Serafini et al. | |
| 5,461,138 A | 10/1995 | Serafini et al. | |
| 5,567,800 A | 10/1996 | Hergenrother et al. | |
| 5,606,014 A | 2/1997 | Connell et al. | |
| 6,333,392 B1 * | 12/2001 | Asao et al. | 528/170 |
| 6,359,107 B1 | 3/2002 | Connell et al. | |
| 2002/0093077 A1 * | 7/2002 | Jung et al. | 257/642 |
| 2003/0064235 A1 | 4/2003 | Okawa et al. | |
| 2005/0014925 A1 | 1/2005 | Yokota et al. | |

FOREIGN PATENT DOCUMENTS

| | | |
|---|---|---|
| CN | 1680465 | 10/2005 |
| JP | 62-184025 | 8/1987 |
| JP | 04-085331 | 3/1992 |
| JP | EP 564235 | * 10/1993 |
| JP | 05-306387 | 11/1993 |
| JP | 2000-204251 | 7/2000 |
| JP | 2001-323064 | 11/2001 |
| JP | 2001-323065 | 11/2001 |
| RU | 2036934 | 6/1995 |

* cited by examiner

*Primary Examiner* — Gregory Listvoyb
(74) *Attorney, Agent, or Firm* — Holland & Bonzagni, P.C.; Mary R. Bonzagni, Esq.

(57) ABSTRACT

A method for using citraconic anhydride and itaconic anhydride as addition cure end caps in reactions for forming polyamic acid oligomers and polyimide oligomers, is provided. Prepregs and high temperature adhesives made from the resulting oligomers, as well as, high temperature, low void volume composites made from the prepregs, are also provided.

6 Claims, No Drawings

TWO-STAGE CURE POLYIMIDE OLIGOMERS

RELATED APPLICATIONS

This application is a divisional of U.S. patent application Ser. No. 11/318,138, filed Dec. 23, 2005, which is a continuation-in-part of U.S. patent application Ser. No. 10/931,070, filed Aug. 30, 2004, now U.S. Pat. No. 7,129,318, which claims benefit of and priority to U.S. Provisional Patent Application Ser. No. 60/499,849, filed Sep. 2, 2003, each of which is incorporated by reference in their entirety.

TECHNICAL FIELD

The present invention generally relates to a method for using citraconic anhydride and itaconic anhydride as addition cure end caps in reactions for forming polyamic acid oligomers and polyimide oligomers. The present invention also generally relates to prepregs and high temperature adhesives made from the resulting oligomers, as well as, high temperature, low void volume, fiber-reinforced composites made from the prepregs.

BACKGROUND ART

Fiber-reinforced composite materials, which are made up of reinforcing fibers and matrix resins, are lightweight and have excellent mechanical properties. As such, these composite materials have been widely used in a variety of structural and non-structural applications such as aerospace, automotive, infra-structure repair, marine, military, and sporting goods or other consumer products that must have sufficient toughness and impact resistance to endure many years of harsh service.

Epoxy resins, and to a lesser extent, unsaturated polyester resins, vinyl ester resins, phenol resins, and polyimide resins, have been employed as matrix resins in fiber-reinforced composite materials. The use of composite materials having polyimide resin matrices is increasing, however, where these materials are now recognized as preferred structural materials in aerospace applications, because of their lightweight and load-bearing characteristics and their oxidative stability at elevated temperatures.

Various methods or techniques such as prepreg, hand lay-up, filament winding, pull-trusion, resin transfer molding (RTM) and resin infusion (RI), have been used to produce fiber-reinforced composite materials.

Current technologies for making prepreg and composites from polyimides utilize solutions from the poly(amide) acids of these resins. Poly(amide) acid solutions are processed into prepreg with various reinforcing fibers. These poly(amide) acid solutions are of low solids contents and high viscosity. Therefore, the processing of these types of solutions requires overcoming significant problems such as solvent management and good fiber wet out from the high viscosity solutions. The resultant prepreg typically requires residual solvent contents of 20 to 25% by weight (approximately 2-3% water from thermal imidization reaction) for adequate tack and drape. This residual solvent must then be removed during the composite cure cycle. This material is hand-laid into composites which makes working with this type of material very labor intensive and costly.

One example of a prior art prepreg solution that when processed into prepreg with suitable reinforcing fibers yielded a high temperature resistant composite, was first marketed in the 1960s under the trade designation SKYBOND by Monsanto Corporation, 800 N. Lindbergh Blvd., St. Louis, Mo. 63167. The SKYBOND prepreg solution was prepared by prereacting 3,3',4,4'-benzophenonetetracarboxylic dianhydride (BTDA) with ethanol using NMP as the solvent. Then, either m-phenylenediamine (MPD) or 4,4'-methylenedianiline (MDA) was added to the solution. No endcapping agent was employed. It was (and continues to be) difficult to fabricate low void composites using this type of chemistry. One of the reasons offered for this difficulty has been that during the cure process branching can occur by the reaction of amine end-groups with the bridging carbonyl group of the BTDA moiety leading to branching and intractability of the matrix resin.

The processability (and thus end-use applications) of these polyimides has been improved by lowering molecular weight and by using reactive endcapping agents to produce thermosetting polyimides.

Originally developed in the 1970s for military aircraft applications, these thermosetting polyimides are produced by dissolving an aromatic diamine, a dialkyl ester of tetracarboxylic acid and a monofunctional nadic ester endcapping agent in a solvent (e.g., alcohol).

The best known of these early thermosetting polyimides is PMR-15, which is shorthand for in-situ polymerization of monomer reactants. These thermosetting polyimides (i.e., benzophenone dianhydride//methylenedianiline//nadic anhydride) were originally developed at NASA Lewis for military aircraft engines and airframes, undergo crosslinking at 250° C. to 300° C. (482° F. to 572° F.), and demonstrate good thermal and mechanical properties. PMR-15 thermosetting polyimides, however, contain the hazardous compound methylenedianiline (MDA), which raises health and safety concerns.

PMR-15 cures with a condensation reaction, which means that water and alcohol are evolved and given off from the polymer chain during cure. PMR-15 does not give a clean two-stage cure. In particular, PMR-15 crosslinks while volatiles are being removed and decomposes during cure to evolve cyclopentadiene. Moreover, the volume of solvent removed such as water, methanol and cyclopentadiene, produces voids in the final composite in an amount equal to greater than 2 percent (%) of the volume of the composite.

A direct PMR-15 replacement with very similar chemistry but using less toxic monomers is the nadic end-capped polyimides RP-46. These thermosetting polyimides (i.e., benzophenone dianhydride//3,4-oxydianiline//nadic anhydride), like PMR-15, cure with a condensation reaction. The two-stage cure is not a clean two-stage cure. Moreover, the resulting composite contains voids in an amount of greater than 2% of the volume of the composite.

Other non-MDA containing polyimides include PETI (i.e., phenylethynyl terminated imide) resins, which represent a different polyimide chemistry. These resins were developed to address the need for structural matrix resins that could provide higher temperature performance and longer-term thermoxidative stability. While more expensive than PMR-type materials, these high temperature resins, which cure in an addition reaction without volatile evolution, can be used to produce substantially void-free composites. Unfortunately, these resins require extremely high cure temperatures of around 375° C./707° F., which are very close to the degradation temperature of these resins. In addition, such high cure temperatures may necessitate specialized autoclave or press equipment for some manufacturers.

A need therefore exists for polyamic acid and polyimide oligomers for use in making adhesives and prepreg, where the polyimide oligomers provide a clean two-stage cure at temperatures of less than or equal to about 370° C.

It is therefore an object of the present invention to provide such polyamic acid and polyimide oligomers.

It is another object to provide solutions suitable for use as prepreg solutions or as high temperature adhesives, which contain one or more of the above-described oligomers and an organic solvent.

It is yet another object of the present invention to provide high temperature, low void volume, fiber-reinforced composites prepared from prepregs made using the inventive prepreg solutions.

SUMMARY OF THE INVENTION

The present invention therefore provides a method for using citraconic anhydride and itaconic anhydride, the method comprising using these materials as addition cure end caps in reactions for forming polyamic acid oligomers and polyimide oligomers.

The present invention also provides a polyamic acid oligomer, which is obtained by reacting one or more aromatic dianhydrides, one or more aromatic diamines, and one or more addition cure end caps selected from the group of citraconic anhydride and itaconic anhydride.

Also provided by way of the present invention is a two-stage cure polyimide oligomer, which is obtained by condensing the polyamic acid oligomer described above.

The present invention also provides a solution suitable for use as a prepreg solution or as a high temperature adhesive, which contains the above-described polyamic acid oligomer and/or polyimide oligomer, and an organic solvent.

The invention further provides a high temperature, low void volume, fiber-reinforced composite material which may be obtained by curing a prepreg in which a fibrous reinforcing material is impregnated with the above-described prepreg solution.

Other features and advantages of the invention will be apparent to one of ordinary skill from the following detailed description.

Unless otherwise defined, all technical and scientific terms used herein have the same meaning as commonly understood by one of ordinary skill in the art to which this invention belongs. All publications, patent applications, patents and other references mentioned herein are incorporated by reference in their entirety. In case of conflict, the present specification, including definitions, will control. In addition, the materials, methods, and examples are illustrative only and not intended to be limiting.

BEST MODE FOR CARRYING OUT THE INVENTION

By way of the present invention, novel addition cure end caps for two-stage cure polyimides have been identified. The novel end caps, namely, citraconic anhydride (CA) and itaconic anhydride (IA), allow for the manufacture of very low void volume composites from polyimide impregnated prepreg using a simple cure schedule. As noted above, the evolution of cure volatiles from condensation cure polyimide resins is well known as a limiting factor in the use of polyimides in structural composites. The present invention solves this problem by providing novel addition cure end caps that possess the correct reactivity to allow volatiles to be removed during composite manufacture. The novel end caps also control molecular weight and act as crosslinkers at higher temperatures.

The polyamic acid oligomer of the present invention is obtained by reacting one or more aromatic dianhydrides, one or more aromatic diamines, and one or more addition cure end caps selected from the group of citraconic anhydride and itaconic anhydride.

Aromatic dianhydrides deemed suitable for use in preparing the inventive polyamic acid oligomer are dianhydrides that generally have more than one aromatic ring in the structure, such as those dianhydrides represented by the following formula (I)

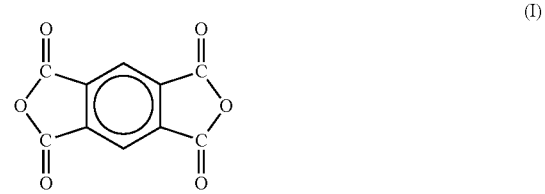

or by the following general formula (II)

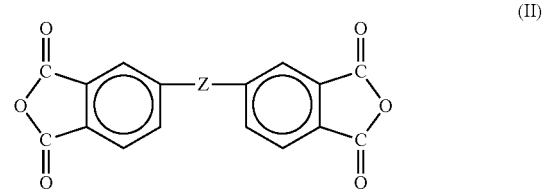

where Z represents —CO—, —O—, —SO$_2$—, or a direct bond. The aromatic dianhydride having the structure (I) is 1,2,4,5-benzenetetracarboxylic dianhydride (pyromellitic dianhydride or PMDA), while aromatic dianhydrides having the structure (II) include 3,3',4,4'-biphenyltetracarboxylic dianhydride (BPDA), 2,2'-bis[4-(3,4-dicarboxyphenoxy) phenyl]propane dianhydride (BPADA), 1,1',2,2'-benzophenone tetracarboxylic dianhydride (BTDA), 4,4'-oxydiphthalic anhydride (OPDA), and 3,3',4,4'-diphenylsulfone tetracarboxylic diandydride (DSDA).

One or more dianhydrides are used to prepare the inventive polyamic acid oligomer. When two dianhydrides are used, the first dianhydride (e.g., BTDA) is preferably present in an amount ranging from about 5 to about 40% by wt. (more preferably, from about 10 to about 25% by wt., and most preferably, from about 20 to about 25% by wt.), based on the total weight of the dianhydrides, while the second dianhydride (e.g., BPDA) is preferably present in an amount ranging from about 95 to about 60% by wt. (more preferably, from about 90 to about 75% by wt., most preferably, from about 80 to about 75% by wt.), based on the total weight of the dianhydrides.

Aromatic diamines deemed suitable for use in the present invention are diamines that generally have at least one ether linkage in the structure, such as 3,4'-oxydianiline (3,4'-ODA), 4,4'-oxydianiline (4,4'-ODA), m-phenylenediamine (m-PDA), 2,2'-bis[4-(4-aminophenoxy)phenyl]propane (BAPP), bis[4-(3-aminophenoxy)phenyl]sulfone (BAPS-M), 1,3-bis(3-aminophenoxy)benzene (APB), and 1,3-bis(4-aminophenoxy)benzene (TPE-R).

One or more diamines are used to prepare the inventive polyamic acid oligomer. When two diamines are used, it is preferred that at least one diamine have one or more oxygen linkages and that this diamine be present in an amount of at least about 50% by wt., based on the total weight of the diamines.

In select embodiments, the aromatic diamine(s) is used in combination with a rubber component. Suitable rubber components include, but are not limited to, amine terminated rubbers. In a preferred embodiment, an amine-terminated silicone rubber (SR) is used to prepare the inventive oligomers. In this preferred embodiment, the rubber is present in an amount of less than about 30% by wt., and more preferably in an amount of less than about 20% by wt., based on the total weight of the aromatic diamine(s) and rubber component.

Addition cure end caps suitable for use in preparing the inventive polyamic acid oligomer are selected from the group of methyl maleic anhydride (citraconic anhydride) and 2-methylenesuccinic anhydride (itaconic anhydride). As will be described in more detail below, these addition cure end caps serve to control volatiles during cure.

The preparation of the polyamic acid oligomer, in accordance with the teachings of the present invention, basically comprises:
(1) charging at least one dianhydride (e.g., BPDA) and at least one diamine (e.g., BAPP) to separate reaction vessels;
(2) adding quantities of a suitable solvent (e.g., 1-methyl-2-pyrrolidinone (NMP)) to each reaction vessel to form a slurry or solution of dianhydride(s) in one vessel, and a slurry or solution of diamine(s) in the other vessel,
(3) heating the slurry or solution contained in each reaction vessel to a temperature ranging from about 50 to about 120° C. to dissolve the dianhydride(s) and the diamine(s);
(4) cooling the solutions contained in each reaction vessel to ambient or room temperature;
(5) slowly adding the dianhydride solution to the diamine solution over a period of time ranging from about 10 to about 60 minutes;
(6) adding a solution of addition cure end cap(s) (e.g., citraconic anhydride (CA) in NMP) to the reaction vessel; and
(7) stirring the solution for a period of time ranging from about 15 to about 120 minutes to form an amic acid solution, wherein, the molar ratio of dianhydride(s) to diamine(s) to addition cure end cap(s) in the amic acid solution ranges from about 1.0/1.95/2.10 to about 1.0/2.1/2.0.

By way of the present invention, it has been discovered that by slowly adding the dissolved dianhydride reactant to the dissolved diamine reactant, while controlling the reaction temperature, the molecular weight of the resulting resin is reduced causing an advantageous reduction in its melting point and melt viscosity.

Solvents suitable for use in the present inventive method include amide-based solvents such as NMP, N,N-dimethylacetamide, N,N-demethylformamide and N-methylcaprolactam, among which NMP and N,N-dimethylacetamide are preferred.

The molar ratio of dianhydride to diamine to addition cure end cap is such that stirring the solution forms low molecular weight prepolymers having at least one end cap radical and suitable for chain extension and crosslinking to form polyimides that have a melting point of less than about 250° C., and a melt viscosity at 250° C. of less than about 25000 cps. Typically the prepolymers have a weight average molecular weight of less than about 10000 grams per mole (g/mol), and generally less than about 5000 g/mol.

In a preferred embodiment, the molar ratio of dianhydride(s):diamine(s):addition cure end cap(s) is 1.0/2.0/2.01, and more preferably the molar ratio is n/n+1/2.

The polyimide oligomer or resin of the present invention is obtained by imidizing the polyamic acid oligomer by chemical or thermal means to cause dehydration and cyclization to occur. In one embodiment, the synthesis of the polyimide oligomer in the form of an imide powder is carried out via chemical imidization in which a strong acid and an azeotropic agent are used to promote ring closure and to remove azeotropic water, respectively. In a preferred embodiment, a strong acid such as methane sulfonic acid is employed as a catalyst and azeotropic water removed by use of a tertiary amine co-solvent such as toluene. More specifically, the imide powder is prepared by:
(1) placing from about 20 to about 40% by wt. (preferably from about 25 to about 35% by wt.) of the amic acid solution and from about 80 to about 60% by wt. (preferably from about 75 to about 65% by wt.) of an azeotropic agent (e.g., toluene) in a reaction vessel;
(2) charging from about 0.05 to about 0.5% by wt. (preferably from about 0.1 to about 0.2% by wt.) of a strong acid catalyst (e.g., methane sulfonic acid) to the reaction vessel to form a mixture;
(3) heating the mixture in the reaction vessel to a temperature of from about 100 to about 130° C. (preferably, from about 120 to about 125° C.) for from about 2 to about 6 hours;
(4) cooling the mixture to ambient or room temperature;
(5) removing the azeotropic agent from the reaction vessel; and
(6) isolating and recovering the solids or imide powder from the remaining solution contained in the reaction vessel.

By way of the present invention, it has been further discovered that the strong acid and the azeotropic agent, when used in the amounts noted above, serve to effectively control ring closure temperature. More specifically, the strong acid causes more water to be generated, while the azeotropic agent decreases the reflux point of the system.

Particularly advantageous polyimide oligomers or resins are provided when the oligomer is prepared by reacting BPDA or BTDA with a diamine selected from the group of 3,4'-ODA, 4,4'-ODA, BAPP and APB, and end-capping any remaining amine groups with either CA or IA. For example, the following oligomers (among others) are contemplated by the present invention:
(i) BPDA//3,4'-ODA/BAPP//CA;
(ii) BPDA//4,4'-ODA/BAPP//CA;
(iii) BTDA//3,4'-ODA/BAPP//CA;
(iv) BPDA//3,4'-ODA/m-APB//CA; and
(v) BPDA//3,4'-ODA/BAPP//IA.

Solutions contemplated by the present invention which are suitable for use as a prepreg solution or as an adhesive contain the above-described polyamic acid oligomer and/or polyimide oligomer, and an organic solvent. In a preferred embodiment, the concentration of oligomers in the solution is greater than or equal to about 25 wt. % (preferably, from about 25 to about 40 wt. %), and the viscosity of the solution ranges from about 10 to about 140 poise (preferably, from about 25 to about 70 poise).

Prepregs for composites may be made by the conventional method of impregnating a suitable fabric or other reinforcement with the above-described prepreg solution.

Prepregs for composites may also be made by interleaving layers of fabric with layers of a resin film comprising the inventive oligomers, and then subjecting the resultant stack of interleaved materials to a simple cure schedule or cycle, as detailed below.

According to a further alternative, the inventive oligomers can be spun into fibers, and woven with fibers of reinforcing material to produce a prepreg. This prepreg is cured in a manner comparable to the method of forming a composite from interleaved oligomer film and fabric layers.

Polymer powder impregnation methods or techniques may also be used to prepare the prepregs. In one such solventless method or technique, dry powder is impregnated into a fiber bundle by causing the fiber bundle to spread, thereby allowing the powder to disperse within the fiber bundle, and then allowing the fiber bundle to contract to hold the powder in place. The impregnated fiber bundle may then be passed through an oven to prepare a prepreg.

The low void volume composites of the present invention may be manufactured from the polyimide impregnated prepreg using conventional methods or techniques (e.g., hot pressing techniques) and a simple cure schedule.

As noted above, the polyimide oligomers or resins of the present invention cure at temperatures of less than or equal to about 370° C. (preferably, less than or equal to about 350° C.) by an addition reaction rather than a condensation reaction, thus controlling volatiles during cure. The cure temperature of the inventive polyimide oligomers or resins is lower than that noted above for PETI resins.

The cure schedule or cycle for the composites of the present invention is composed of two stages: a first stage for volatile removal followed by consolidation; and a second stage for full cure. Preferably, in the first stage, the temperature of the prepreg would be increased to about 250° C. by, for example, a hot-pressing machine and kept at this temperature for from about 1 to about 4 hours to effect volatile removal. Pressure would then be applied to the prepreg by the hot-pressing machine to effect consolidation and thus to remove voids, the pressure increasing from about 4.2 to about 6.0 megapascals (MPa). Simultaneously, the temperature of the prepreg would be increased to about 350° C. In the second stage, the temperature of the consolidated prepreg would be maintained at 350° C. for from about 1 to about 4 hours, to effect crosslinking via a nonvolatile producing reaction.

The polyimide oligomers or resins with novel addition cure end caps of the present invention maintain a low enough viscosity (i.e., less than or equal to 2500 poise) during the first stage of the two-stage cure cycle thereby allowing for effective removal of volatiles followed by consolidation of the composite to remove voids. During the second stage of the two-stage cure cycle, crosslinking takes place by way of a nonvolatile producing reaction. In other words, the polyimide oligomers or resins of the present invention give a "clean" two stage cure.

The resulting high temperature composites of the present invention demonstrate a combination of desirable properties after cure that render them suitable for use in a wide variety of applications such as aerospace, military, and infra-structure repair applications. More specifically, these high temperature composites exhibit a use temperature of greater than about 200° C., and further exhibit a $T_g$ ranging from about 210° C. to about 300° C. (preferably from about 210° C. to about 275° C.), flexural strength (ASTM D-790) ranging from about 400 to about 1200 MPa, toughness, microcrack resistance, solvent and moisture resistance, damage tolerance, and good retention of mechanical properties under hot/wet conditions.

The inventive composites also have a low void volume. By "low void volume" it is meant that the composite has a void volume, i.e. the volume of the composite which is air space, of from about 1 to about 2 (preferably, from about 0.5 to about 1.5, more preferably, from about 0.5 to about 1.0) percent (%) of the volume of the composite. The void volume of the inventive composites is lower than that noted above for the PMR-15 and RP-46 composites.

Reinforcing fibers suitable for use in the inventive composite include carbon fibers, glass fibers, and quartz fibers.

The solution of the present invention may also be used as an adhesive allowing for substantially void-free bonding of large areas and thus the production of substantially void-free laminates. By way of example, materials such as carbon or glass fabrics may be laminated together by applying the inventive solution to the fabric surfaces, assembling the fabric layers, and then subjecting the assembled layers to the two-stage cure schedule or cycle described above. As will be readily appreciated by those skilled in the art, debonding problems attributed to volatile evolution during cure of prior art polyimide laminates are solved by the present invention.

EXAMPLES

The subject invention will now be described by reference to the following illustrative examples. The examples are not, however, intended to limit the generally broad scope of the present invention.

Each example was tested for flexural strength and glass transition temperature in accordance with the following test methods.

Flexural Strength (MPa)—
Flexural strength was measured according to ASTM D-790.
Glass Transition Temperature (Tg)—
The glass transition temperature was measured at a temperature rising rate of 2° C./minute in a nitrogen atmosphere using a dynamic mechanical analyzer (DMA).

Unless otherwise stated, procedures, conditions, etc. detailed below for the preparation of the BPDA/CA//3,4'-ODA/BAPP prepreg solution and composites were also used to prepare the remaining prepreg solutions and composites of Examples 9 to 17 in this EXAMPLES section.

Examples 1 to 8

BPDA/CA (83/34)//3,4'-ODA/BAPP (85/15)

In Examples 1 to 8, components 3,4'-ODA (34.000 g, 0.170 mol), BAPP (12.300 g, 0.030 mol) and NMP (104.15 g) were added to a 500 milliliter (ml) three-neck flask equipped with a mechanical stirrer and a heater. The resulting mixture was completely dissolved to from a solution. BPDA (48.804 g, 0.166 mol) was dispersed in NMP (104.15 g) and the resulting dispersion was added to the solution in the three-neck flask. The resulting mixture was then stirred at a rate of 80 revolutions per minute (rpm) at 60° C. for 8 hours to provide a solution. Finally, a solution of CA (7.616 g, 0.068 mol) in NMP (10.0 g) was added to the solution in the three-neck flask and the resulting mixture stirred at 60° C. for 2 hours. A prepreg solution having a solids content of 30 wt. % and a viscosity of 31 poise was obtained.

Eight sheets of woven carbon fabric obtained from Cytec Engineered Materials, Inc., 1440 N. Kraemer Blvd., Anaheim, Calif. 92806 ("Cytec Engineered Materials") were then impregnated with the prepreg solution under the following conditions: Each sheet was wetted with the prepreg solution and then dried at 80° C. for 20 minutes. Each sheet was then re-wetted with the prepreg solution and dried again at 80° C. for 20 minutes. The dried sheets were then imidized according to the following schedule: 120° C. for 1 hour; 150° C. for 0.5 hour; 200° C. for 1 hour; and 250° C. for 1 hour. Eight imidized sheets were then arranged in an 11×18 centimeter (cm) hot-pressing machine manufactured by Toyo Seiki Seisaku-sho, Ltd. (model no. MP-SCH) and subjected to an initial pressure of 4.2 megapascals (MPa) and a cure regimen as described in Table 1 below. The initial pressure increased to 5 to 6 MPa over time as the cure temperature increased. This process was repeated seven times. The weight percent of cured resin to the sum of cured resin and carbon fabric ([cured resin]/{[cured resin]+[carbon fabric]}) of the resulting composites ranged from 30 to 35 wt. %. Once prepared, the composites were tested for flexural strength and glass transition temperature, with the results reported in Table 1.

TABLE 1

Summary of Examples 1 to 8

| Example | 1st step Temp. (° C.) | 1st step Time (hr) | 2nd step Temp. (° C.) | 2nd step Time (hr) | 3rd step Temp. (° C.) | 3rd step Time (hr) | Flexural Strength (MPa) Ave. | Flexural Strength (MPa) S.D. | Flexural Strength (MPa) Median | Tg (° C.) |
|---|---|---|---|---|---|---|---|---|---|---|
| 1 | 250 | 1 | 250-350 | 0.5 | 350 | 1 | 945 | 35 | 947 | 216 |
| 2 | 250 | 1 | 250-350 | 0.5 | 350 | 2 | 921 | 66 | 962 | 217 |
| 3 | 250 | 1 | 250-350 | 0.5 | 370 | 1 | 591 | 174 | 507 | 230 |
| 4 | 250 | 4 | 250-350 | 0.5 | 350 | 1 | 860 | 60 | 900 | 215 |
| 5[1] | 250 | 4 | 250-350 | 0.5 | 350 | 1 | 872 | 27 | 868 | 229 |
| 6[1] | 250 | 1 | 250-350 | 0.5 | 350 | 4 | 891 | 50 | 900 | 224 |
| 7[2] | 250 | 1 | 250-350 | 0.5 | 350 | 1 | 560 | 20 | 555 | 250 |
| 8[3] | 250 | 1 | 250-350 | 0.5 | 350 | 1 | 968 | 80 | 987 | 234 |

[1]pressure due to volatile evolution was released during each step
[2]composite made using eight sheets of 350° C. prepreg, surface of composite was rough
[3]composite made using woven carbon fabric cured at 400° C. for 1 hour to remove sizing agent Examples 1 to 8 showed high levels of flexural strength (flexural strength$_{avg}$=826). The surface of each composite (with the exception of the Example 7 composite) was smooth, indicating good resin flow and a good processing window. Also, the glass transition temperatures of these composites (Tg$_{avg}$=227° C.) were low, and in fact lower than that obtained for films cast from the same prepreg solution.

Example 9

BPDA/CA (83/34)//4,4'-ODA/BAPP (85/15)

In this Example, aromatic diamine 4,4'-ODA was used instead of aromatic diamine 3,4'-ODA. The prepreg solution had a solids content of 30 wt. % and a viscosity of 64 poise. The composite test results are shown in Table 2.

TABLE 2

Summary of Example 9

| Example | 1st step Temp. (° C.) | 1st step Time (hr) | 2nd step Temp. (° C.) | 2nd step Time (hr) | 3rd step Temp. (° C.) | 3rd step Time (hr) | Flexural Strength (MPa) Ave. | Flexural Strength (MPa) S.D. | Flexural Strength (MPa) Median | Tg (° C.) |
|---|---|---|---|---|---|---|---|---|---|---|
| 9 | 250 | 1 | 250-350 | 0.5 | 350 | 1 | 545 | 14 | 545 | 263 |

Example 9 showed an acceptable level of flexural strength, but had a somewhat rough surface indicating less than optimal resin flow. The glass transition temperature of this composite was higher than the average of the above Examples 1 to 8.

Examples 10 to 13

BPDA/CA (80/40)//4,4'-ODA/BAPP (50/50)

In these Examples, the ratios of aromatic dianhydride to end cap and aromatic diamine 4,4'-ODA to aromatic diamine BAPP were changed to 80/40 and 50/50, respectively. The prepreg solution had a solids content of 30 wt. % and a viscosity of 28 poise. The composite test results are shown in Table 3.

TABLE 3

Summary of Examples 10 to 13

| Example | 1st step Temp. (° C.) | 1st step Time (hr) | 2nd step Temp. (° C.) | 2nd step Time (hr) | 3rd step Temp. (° C.) | 3rd step Time (hr) | Flexural Strength (MPa) Ave. | Flexural Strength (MPa) S.D. | Flexural Strength (MPa) Median | Tg (° C.) |
|---|---|---|---|---|---|---|---|---|---|---|
| 10 | 250 | 1 | 250-350 | 0.5 | 350 | 1 | 880 | 46 | 867 | 219 |
| 11[1] | 250 | 1 | 250-350 | 0.5 | 350 | 1 | 810 | 21 | 810 | 228 |
| 12 | 250 | 1 | 250-350 | 0.5 | 350 | 2 | 797 | 37 | 783 | 211 |
| 13 | 250 | 1 | 250-350 | 0.5 | 370 | 2 | 571 | 91 | 539 | 216 |

[1]pressure due to volatile evolution was released during each step

Examples 10 to 13 showed high levels of flexural strength (flexural strength$_{avg}$=765). The surface of each composite was smooth, indicating good resin flow and a good processing window. Also, the glass transition temperatures of these composites (Tg$_{avg}$=219° C.) were slightly lower than the previous Examples as well as lower than that obtained for films cast from the same prepreg solution.

Examples 14 and 15

BTDA/CA (83/34)//3,4'-ODA/BAPP (85/15)

Instead of the aromatic dianhydride BPDA used in Examples 1 to 8, these Examples used aromatic dianhydride BTDA. The prepreg solution had a solids content of 30 wt. % and a viscosity of 32 poise. The composite test results are shown in Table 4.

TABLE 4

Summary of Examples 14 and 15

| | 1$^{st}$ step | | 2$^{nd}$ step | | 3$^{rd}$ step | | Flexural Strength (MPa) | | | Tg |
|---|---|---|---|---|---|---|---|---|---|---|
| Example | Temp. (° C.) | Time (hr) | Temp. (° C.) | Time (hr) | Temp. (° C.) | Time (hr) | Ave. | S.D. | Median | (° C.) |
| 14 | 250 | 1 | 250-350 | 0.5 | 350 | 1 | 709 | 55 | 708 | 245 |
| 15 | 275 | 1 | 275-350 | 0.5 | 350 | 1 | 727 | 36 | 725 | 250 |

Examples 14 and 15 also showed high levels of flexural strength (flexural strength$_{avg}$=718), but had somewhat rough surfaces indicating less than optimal resin flow. The glass transition temperatures of these composites (Tg$_{avg}$=248° C.) were slightly higher than the average of the above Examples 1 to 8.

Example 16

BPDA/CA (83/34)//3,4'-ODA/m-APB (85/15)

Instead of the aromatic diamine BAPP used in Examples 1 to 8, this Example used aromatic diamine m-APB. The prepreg solution had a solids content of 30 wt. % and a viscosity of 33 poise. The composite test results are shown in Table 5.

TABLE 5

Summary of Example 16

| | 1$^{st}$ step | | 2$^{nd}$ step | | 3$^{rd}$ step | | Flexural Strength (MPa) | | | Tg |
|---|---|---|---|---|---|---|---|---|---|---|
| Example | Temp. (° C.) | Time (hr) | Temp. (° C.) | Time (hr) | Temp. (° C.) | Time (hr) | Ave. | S.D. | Median | (° C.) |
| 16 | 250 | 1 | 250-350 | 0.5 | 350 | 1 | 911 | 21 | 923 | 215 |

Example 16 showed high levels of flexural strength. The surface of this composite was smooth, indicating good resin flow and a good processing window. Also, the glass transition temperature of this composite was lower than the average glass transition temperatures obtained for previous Examples as well as lower than that obtained for films cast from the same prepreg solution.

Example 17

BPDA/IA (83/34)//3,4'-ODA/BAPP (85/15)

Instead of the end cap CA used in Examples 1 to 8, this Example used end cap IA. The prepreg solution had a solids content of 30 wt. % and a viscosity of 31 poise. The composite test results are shown in Table 6.

TABLE 6

Summary of Example 17

| Example | 1st step Temp. (° C.) | 1st step Time (hr) | 2nd step Temp. (° C.) | 2nd step Time (hr) | 3rd step Temp. (° C.) | 3rd step Time (hr) | Flexural Strength (MPa) Ave. | Flexural Strength (MPa) S.D. | Flexural Strength (MPa) Median | Tg (° C.) |
|---|---|---|---|---|---|---|---|---|---|---|
| 17 | 250 | 1 | 250-350 | 0.5 | 350 | 1 | 840 | 69 | 843 | 215 |

Example 17 also showed high levels of flexural strength. The surface of this composite was smooth, indicating good resin flow and a good processing window. Also, the glass transition temperature of this composite was the same as Example 16 as well as lower than that obtained for films cast from the same prepreg solution.

The above-referenced Examples demonstrate that the polyamic acid oligomers and polyimide oligomers prepared in accordance with the teachings of the present invention have low $T_g$s and good processing windows, while the inventive composites exhibit good flexural properties in the form of high flexural strength.

Comparative Examples C-1 to C-3

SKYBOND 1000

In these Comparative Examples, eight sheets of woven carbon fabric obtained from Cytec Engineered Materials were impregnated with a solution of polyimide precursors obtained from Industrial Summit Technology Corporation, 500 Cheesequake Road, Parlin, N.J. 08859, under the product designation SKYBOND 1000, under the following conditions: Each sheet was wetted with the SKYBOND 1000 prepreg solution and then dried at 80° C. for 20 minutes. The dried sheets were then imidized according to the following schedule: 120° C. for 1 hour; 150° C. for 0.5 hour; 200° C. for 1 hour; and 225° C. for 1 hour. The dried, imidized sheets were then arranged in an 11×18 cm hot-pressing machine manufactured by Toyo Seiki Seisaku-sho, Ltd. (model no. MP-SCH) and subjected to an initial pressure of 4.2 MPa and a cure regimen as described in Table 7 below. The initial pressure increased to 5 to 6 MPa over time as the cure temperature increased. This process was repeated two times. The weight percent of cured resin to the sum of cured resin and carbon fabric ([cured resin]/{[cured resin]+[carbon fabric]}) of the resulting composites ranged from 35 to 40 wt. %. Once prepared, the composites were tested for flexural strength and glass transition temperature, with the results reported in Table 7.

TABLE 7

Summary of Comparative Examples C-1 to C-3

| Example | 1st step Temp. (° C.) | 1st step Time (hr) | 2nd step Temp. (° C.) | 2nd step Time (hr) | 3rd step Temp. (° C.) | 3rd step Time (hr) | Flexural Strength (MPa) Ave. | Flexural Strength (MPa) S.D. | Flexural Strength (MPa) Median | Tg (° C.) |
|---|---|---|---|---|---|---|---|---|---|---|
| C-1 | 250 | 1 | 250-350 | 0.5 | 350 | 1 | 549 | 16 | 548 | 310 |
| C-2[1] | 250 | 1 | 250-350 | 0.5 | 350 | 1 | 565 | 48 | 569 | — |
| C-3 | 275 | 1 | 275-350 | 0.5 | 350 | 1 | 515 | 63 | 498 | 306 |

[1]composite made using eight sheets of 200° C. prepreg, pressure due to volatile evolution was released during each step Comparative Examples C-1 to C-3 showed lower levels of flexural strength (flexural strength$_{avg}$=543). The surfaces of these composites were rough, indicating less than optimal resin flow. Moreover, the glass transition temperatures of these composites (Tg$_{avg}$=308° C.) were considerably higher than the average of the above Examples 1 to 17.

Comparative Examples C-4 to C-8

SKYBOND 2000

Instead of SKYBOND 1000 prepreg solution, Comparative Examples C-4 to C-8 were prepared using SKYBOND 2000 prepreg solution in accordance with the procedures, conditions, etc. detailed above for Comparative Examples C-1 to C-3. The composite test results are shown in Table 8.

TABLE 8

Summary of Comparative Examples C-4 to C-8

| Example | 1st step Temp. (° C.) | 1st step Time (hr) | 2nd step Temp. (° C.) | 2nd step Time (hr) | 3rd step Temp. (° C.) | 3rd step Time (hr) | Flexural Strength (MPa) Ave. | Flexural Strength (MPa) S.D. | Flexural Strength (MPa) Median | Tg (° C.) |
|---|---|---|---|---|---|---|---|---|---|---|
| C-4 | 250 | 1 | 250-350 | 0.5 | 350 | 1 | 582 | 55 | 581 | 295 |
| C-5 | 250 | 1 | 250-350 | 0.5 | 350 | 1 | 661 | 41 | 652 | 264 |
| C-6[1] | 250 | 1 | 250-350 | 0.5 | 370 | 1 | 613 | 105 | 614 | — |
| C-7[1] | 250 | 4 | 250-350 | 0.5 | 350 | 1 | 664 | 63 | 684 | — |
| C-8[2] | 250 | 4 | 250-350 | 0.5 | 350 | 1 | 782 | 144 | 832 | 239 |

[1] pressure due to volatile evolution was released during each step
[2] composite made using eight sheets of 200° C. prepreg Comparative Examples C-4 to C-8 also showed lower levels of flexural strength (flexural strength$_{avg}$=660). The surface of Comparative Example C-4 was rough. The glass transition temperatures of these composites (Tg$_{avg}$=266° C.) were also higher than the average of the above Examples 1 to 17.

While various embodiments of the present invention have been described above, it should be understood that they have been presented by way of example only, and not limitation. Thus, the breadth and scope of the present invention should not be limited by any of the exemplary embodiments.

Having thus described the invention, what is claimed is:

1. A high temperature, low void volume, fiber-reinforced composite material obtained by consolidating and curing a prepreg in which a fibrous reinforcing material is impregnated with a solution using a two-stage cure schedule,
   wherein the solution comprises: (a) a polyimide oligomer; and (b) one or more organic solvents, wherein the polyimide oligomer is a condensation product of a polyamic acid oligomer that is obtained by reacting one or more aromatic dianhydrides, one or more aromatic diamines devoid of aliphatic groups in polymer backbone between aromatic groups, and an addition cure end cap comprising citraconic anhydride, and has a melting point of less than about 250° C., and a melt viscosity at 250° C. of less than about 25000 cps,
   wherein the polyimide oligomer still flows after the one or more organic solvents are removed from the solution by heating to a temperature of about 250° C. and maintaining that temperature for from about 1 to about 4 hours,
   wherein: in a first stage of the two-stage cure schedule, the prepreg is cured at temperatures up to about 250° C. for from about 1 to about 4 hours to remove volatiles, and then consolidated, the viscosity of the oligomers during the first stage being less than or equal to 2500 poise, wherein the polyimide oligomer still flows after the volatiles have been removed from the prepreg, which allows voids in the composite material to close during consolidation; and in a second stage, full cure is effected by crosslinking via a nonvolatile-producing reaction.

2. The high temperature, low void volume, fiber-reinforced composite of claim 1, which has a void volume ranging from about 1 to about 2 percent of the volume of the composite.

3. The high temperature, low void volume, fiber-reinforced composite of claim 2, which has a void volume ranging from about 0.5 to about 1.5 percent of the volume of the composite.

4. A high temperature, low void volume, fiber-reinforced composite material obtained by consolidating and curing a prepreg in which a fibrous reinforcing material is impregnated with a prepreg solution followed by using a two-stage cure schedule, the solution comprising: (a) a polyimide oligomer; and (b) one or more organic solvents, wherein the polyimide oligomer is a condensation product of a polyamic acid oligomer that is obtained by reacting one or more aromatic dianhydrides, one or more aromatic diamines devoid of aliphatic groups in polymer backbone between aromatic groups, and an addition cure end cap comprising citraconic anhydride, and has a melting point of less than about 250° C., and a melt viscosity at 250° C. of less than about 25000 cps,
   wherein in a first stage of the two-stage cure schedule, the impregnated fibrous reinforcing material is cured to remove the one or more organic solvents, and then consolidated,
   wherein the polyimide oligomer still flows after the one or more organic solvents are removed, which allows voids in the composite material to close during consolidation.

5. The high temperature, low void volume, fiber-reinforced composite material of claim 4, wherein the one or more aromatic diamines are selected from the group of 3,4'-oxydianiline, 4,4'-oxydianiline, m-phenylenediamine, 2,2'-bis[4-(4-aminophenoxy)phenyl]propane, bis[4-(3-aminophenoxy)phenyl]sulfone, 1,3-bis(3-aminophenoxy)benzene, and 1,3-bis(4-aminophenoxy)benzene.

6. The high temperature, low void volume, fiber-reinforced composite material of claim 4, wherein in the first stage the impregnated fibrous reinforcing material is cured at temperatures up to about 250° C. for from about 1 to about 4 hours to remove volatiles.

* * * * *